United States Patent
Jylanki

(10) Patent No.: US 8,824,716 B2
(45) Date of Patent: Sep. 2, 2014

(54) APPARATUS FOR MAGNETIC FIELD INDUCTION IN PORTABLE DEVICES

(75) Inventor: Juha Petteri Jylanki, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/581,312

(22) PCT Filed: Feb. 26, 2010

(86) PCT No.: PCT/IB2010/050845
§ 371 (c)(1),
(2), (4) Date: Aug. 26, 2012

(87) PCT Pub. No.: WO2011/104585
PCT Pub. Date: Sep. 1, 2011

(65) Prior Publication Data
US 2012/0321115 A1     Dec. 20, 2012

(51) Int. Cl.
*H04R 25/00* (2006.01)
*H01F 27/04* (2006.01)

(52) U.S. Cl.
USPC ........................................... 381/331; 336/107

(58) Field of Classification Search
USPC ............. 381/312–331; 455/41.1, 575.7, 90.1, 455/90.3; 379/52
See application file for complete search history.

(56) References Cited

U.S. PATENT DOCUMENTS

| | | | |
|---|---|---|---|
| 6,516,075 B1 * | 2/2003 | Jacobs et al. | 381/331 |
| 7,020,298 B1 * | 3/2006 | Tziviskos et al. | 381/330 |
| 7,418,106 B2 | 8/2008 | Greuet et al. | 381/331 |
| 7,783,067 B1 * | 8/2010 | Frerking et al. | 381/315 |
| 2008/0192969 A1 * | 8/2008 | Welner | 381/314 |
| 2011/0116750 A1 * | 5/2011 | Terlizzi et al. | 385/88 |
| 2012/0309310 A1 | 12/2012 | Greuet | 455/41.1 |

* cited by examiner

*Primary Examiner* — Brian Ensey
*Assistant Examiner* — Norman Yu
(74) *Attorney, Agent, or Firm* — Harrington & Smith

(57) ABSTRACT

An apparatus comprising at least one signal coil; and a connection plug, comprising a first electrical connector connected to one end of at least one signal coil and a second electrical connector connected to a second end of at least one signal coil.

19 Claims, 7 Drawing Sheets

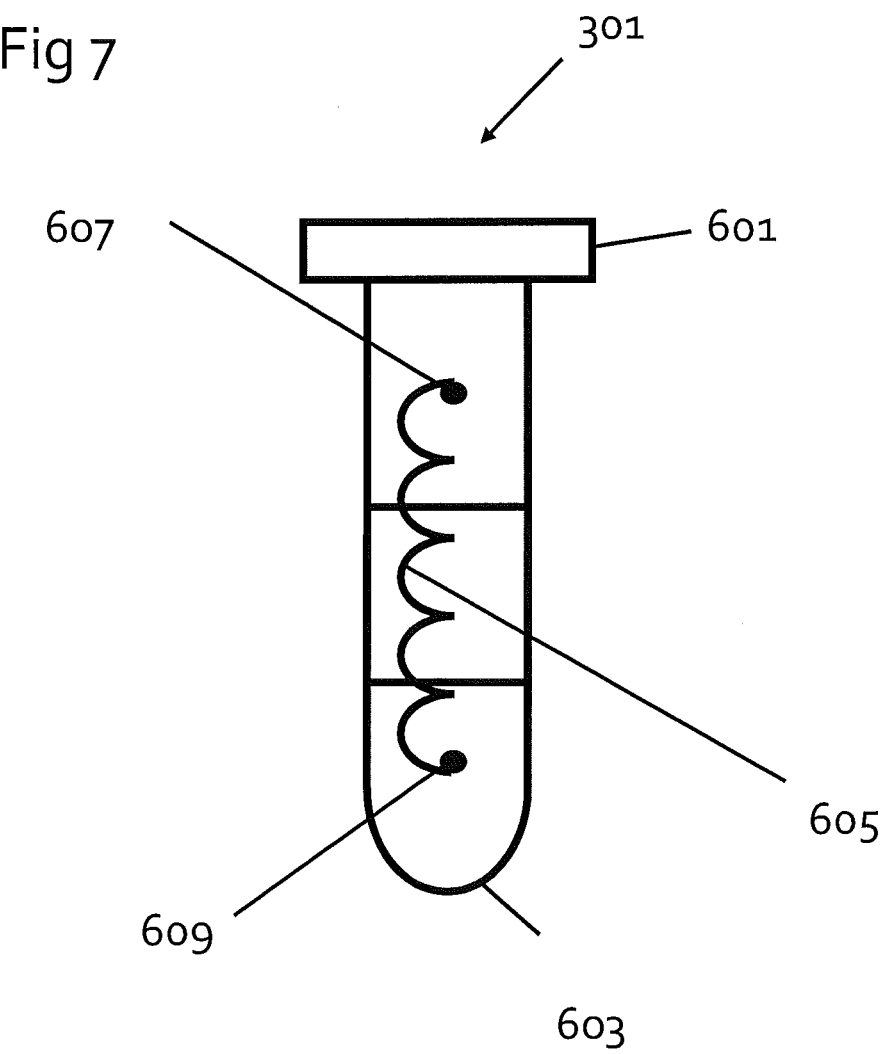

APPARATUS FOR MAGNETIC FIELD INDUCTION IN PORTABLE DEVICES

RELATED APPLICATION

This application was originally filed as PCT Application No. PCT/IB2010/050845 filed Feb. 26, 2010.

The present invention relates to apparatus for magnetic field induction. The invention further relates to, but is not limited to, apparatus for magnetic field induction in portable devices.

Magnetic induction for hearing aid coupling is known. In hearing aid compatible (HAC) devices, such as mobile telephones or media playback devices, the generation of magnetic fields dependent on an audio signal can be sensed by a hearing aid device in (T)-coil mode which converts the magnetic field into an associated audio signal to be heard by the user order to. In some previous examples the magnetic fields are generated by a loop or coil implemented nearby the earpiece within the device, so that the device when held normally generates a magnetic field close to the hearing aid.

In some other examples the electronic device implements the transducer in locations away from the earpiece. For example the printed circuit board within the electronic device may have conductive coils suitable to generate a magnetic field. In other devices there may be provided internal conductive pathways within the electronic device separate from the circuit board similarly generating the magnetic field.

Such examples however require complex integration design and require valuable circuit board area or device volume to implement. Furthermore as the electronic devices themselves are reduced in size in order to make the device more portable the electronic components within the electronic device are similarly reduced in size. Hence for example available area for conductive path implementation on the circuit board is decreased and/or the volume within the device is decreased for freestanding implementations.

This invention thus proceeds from the consideration that it may be possible to improve magnetic field generation by implementing a signal coil or coils within apparatus which may be releasably in contact with the electronic apparatus. In such embodiments the apparatus may be provided with the means to operate inductive applications such as hearing aid compatibility, wireless charging, or contactless data communication.

Embodiments of the present invention aim to address the above problem.

There is provided according to a first aspect of the invention an apparatus comprising: at least one signal coil; and a connection plug, comprising a first electrical connector connected to one end of at least one signal coil and a second electrical connector connected to a second end of at least one signal coil.

The at least one signal coil may be physically located substantially within the connection plug.

The apparatus may further comprise a housing part, wherein the housing part may be physically connected to the connection plug, and wherein the at least one signal coil may be physically located substantially within the housing part.

The apparatus may further comprise an adjustable connection part configured to provide the physical and electrical connection between the housing part and the connection plug.

The apparatus may further comprise a switch wherein the at least one signal coil may be at least two signal coils, wherein each signal coil may be configured to be orientated relative to another signal coil, and wherein at least one of the signal coils from the at least two signal coils is selected by the switch.

The apparatus may further comprise at least one further signal coil, and the connection plug may comprise a third electrical connector connected to one end of the further signal coil, wherein at least one of the first or second electrical connector may be configured to be connected to the other end of the further signal coil.

The apparatus may further comprise an identification unit configured to be connected to the connection plug and provide a signal to a further apparatus for identifying the apparatus when the apparatus connection plug is inserted into an associated further apparatus socket.

The connection plug may be at least one of: a 3.5 mm jack plug; a 2.5 mm jack plug; an universal serial bus plug; and a power connector plug.

The signal coil may be configured to generate a magnetic field suitable for reception by a hearing aid.

According to a second aspect of the invention there is provided a method comprising: receiving at an apparatus connection socket a further apparatus connection plug with a current loop connection to at least one signal coil; identifying the at least one signal coil; and selecting an operational parameter for the apparatus dependent on the identity of the at least one signal coil.

Identifying the at least one signal coil may comprise: receiving a first signal via the connection socket from the further apparatus; and determining an identity of the at least one signal coil dependent on the first signal.

The method may further comprise: transmitting an inquiry signal via the connection socket to the further apparatus wherein the further apparatus is configured to generate the first signal dependent on the inquiry signal.

According to a third aspect of the invention there is provided an apparatus comprising at least one processor and at least one memory including computer program code the at least one memory and the computer program code configured to, with the at least one processor, cause the apparatus at least to perform: receive at a connection socket a further apparatus connection plug with a current loop connection to at least one signal coil; identify the at least one signal coil; and select an operational parameter for the apparatus dependent on the identity of the at least one signal coil.

The apparatus caused to identify the at least one signal coil may cause the apparatus to further perform: receive a first signal via the connection socket from the further apparatus; and determine an identity of the at least one signal coil dependent on the first signal.

The apparatus may be further configured to perform: transmitting an inquiry signal via the connection socket to the further apparatus wherein the further apparatus is configured to generate the first signal dependent on the inquiry signal.

According to a fourth aspect of the invention there is provided an apparatus comprising: a connection socket comprising at least a first and second connection and configured to receive a further apparatus connection plug, the further apparatus connection plug comprising a first electrical connector connected to one end of a further apparatus at least one signal coil and a second electrical connector connected to a second end of a further apparatus at least one signal coil, wherein the connection socket first connection is configured to be in connection with the connection plug first connection and the connection socket second connection is configured to be in connection with the connection plug second socket.

The apparatus may further comprise an identifier determiner configured to determine the identity of the further apparatus.

The apparatus may further comprise a parameter determiner configured to select at least one operational parameter for the apparatus dependent on the identity of the further apparatus.

The apparatus may further comprise a current driver configured to supply a current via the connection plug and the connection socket to the at least one signal coil suitable for generating a magnetic field.

The apparatus may further comprise an audio transducer, wherein the current driver is configured to supply a second current to the transducer, wherein the second current and the current supplied to the at least one signal coil are dependent on an audio signal.

The signal coil magnetic field may be in phase with a magnetic field generated by the audio transducer.

BRIEF DESCRIPTION OF DRAWINGS

For better understanding of the present invention, reference will now be made by way of example to the accompanying drawings in which:

FIG. 7 shows schematically further embodiments suitable for implementing some embodiments of the application and also connectable to electronic devices as shown in FIG. 1.

DETAILED DESCRIPTION OF SOME EMBODIMENTS

Figure 1:
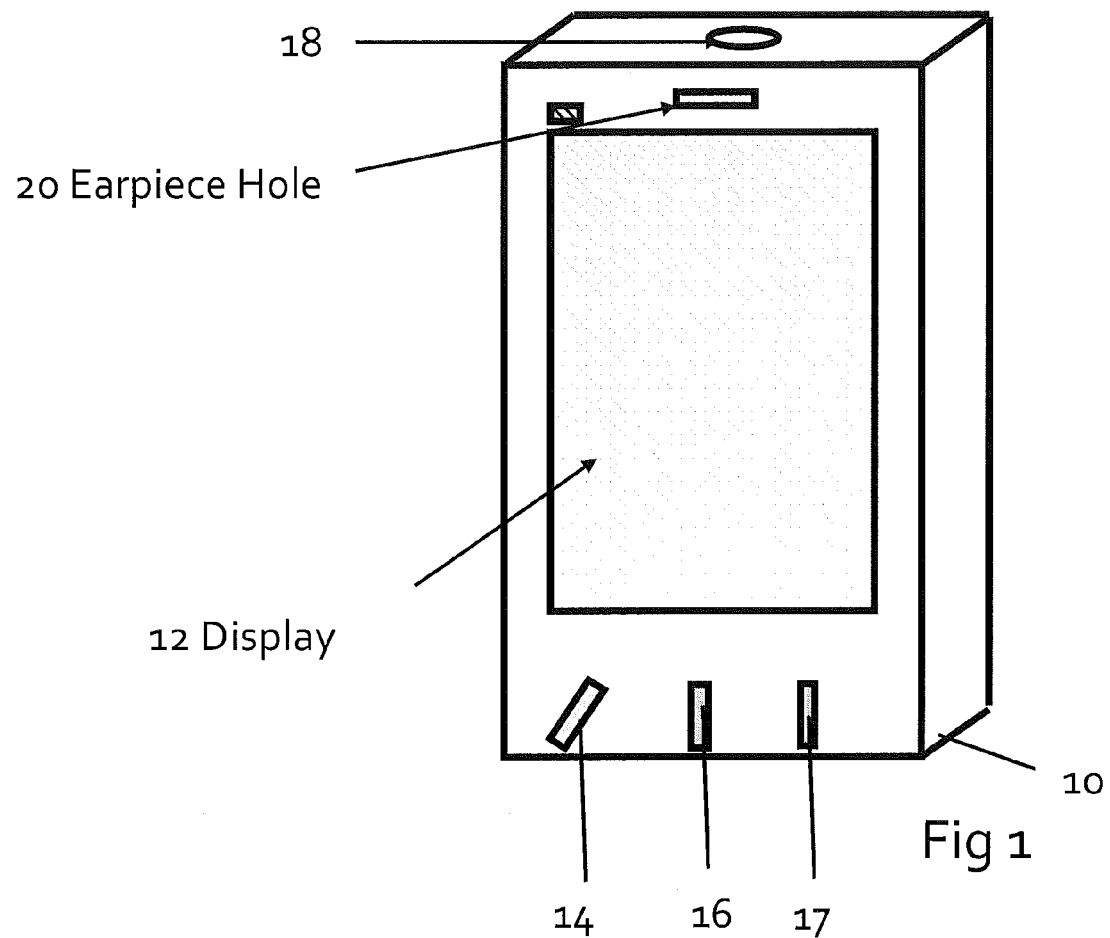
FIG. 1 shows schematically an electronic device employing embodiments of the application.

The following describes apparatus and methods for generating of magnetic fields in electronic devices or apparatus. In this regard reference is made to FIG. 1 which shows a schematic diagram of an exemplary electronic device or apparatus 10 which may be associated with a magnetic field generating apparatus according to embodiments of the application.

The apparatus may for example be a mobile terminal or user equipment for a wireless communication system. In other embodiments the electronic device or apparatus may be an audio player (also known as MP3 players), a media player (also known as MP4 players), or an electronic book reader.

In some other embodiments the apparatus may be any suitable electronic device such as a personal data assistant (PDA), personal computer (such as a net book, tablet, or other mobile personal computer), or an electronic wallet. Although the following examples typically describe a mobile or portable apparatus, it would be appreciated that embodiments may be fixed in position.

The apparatus 10 comprises a display 12 mounted on the frame of the apparatus 10 and may be suitable in some embodiments for providing the user with a user interface for displaying data. The display 12 in some embodiments can further be a touch screen display unit suitable for providing the user of the phone not only with displayed information but the ability via a touch sensitive area to relay touch based selections to the apparatus.

The apparatus 10 furthermore in some embodiments comprises input switches or buttons such as input button 1 14, input button 2 16 and input button 3 17 suitable for providing inputs to the apparatus via a user interface other than the touch panel 12.

The apparatus 10 furthermore in some embodiments comprises an earpiece hole 20 for enabling the output of acoustic waves generated via an acoustic or audio transducer located within the apparatus 10.

The apparatus 10 further comprises a connector socket 18 which is configured to receive a connector plug. The connector socket 18 in some embodiments is an audio or audio/video socket. For example in some embodiments the connector socket is a 3.5 mm audio/video jack socket, however it would be appreciated that the connector socket may be any suitable socket with associated connections. For example the connector may be a 2.5 mm audio jack, a universal serial bus type socket or even power connector socket.

The apparatus 10 may further comprise a processor which may be connected via suitable connections to the connections of the connector socket.

The apparatus 10 may in some embodiments comprise an audio subsystem configured to output audio signals. The processor may in some embodiments be connected to the audio subsystem. The audio subsystem in some embodiments may be configured to output audio signals from the processor to an audio transducer associated with the earpiece hole 20 or in some embodiments to an earpiece/headset which may be connected via the connector socket. In such embodiments the user may insert an audio connector plug into the audio connector socket connected to a headset wherein the connection enables an audio transducer in the headset to generate acoustic waves.

The apparatus in some embodiments comprises a transceiver (TX/RX) suitable for transmitting and receiving data with further apparatus via a wireless communication protocol. Any suitable wireless communication protocol may be implemented in embodiments of the application. The processor in some embodiments is further linked to the transceiver and may control the operation of the transceiver and/or pass data to or receive data from the transceiver.

The transceiver in some embodiments enables communication with other apparatus, for example via a cellular or mobile phone gateway service such as node B or base transceiver stations (BTS) and a wireless communications network, or short range wireless communications to other apparatus located remotely from the apparatus.

The apparatus in some embodiments can further comprise a memory to which the processor is connected. The processor may be configured to execute various program codes. The implemented program codes may in some embodiments control the operation of a further apparatus comprising a signal loop and connectable to the apparatus via the connection socket 18 as will be described later. The implemented program codes may be stored for example in the memory for retrieval by the processor whenever needed. The memory in some embodiments may further provide a section for storing data received from the further apparatus.

It is understood that the structure of the apparatus 10 could be supplemented and varied in many ways and that the example shown in FIG. 1 represents only part of the operation of an apparatus comprising exemplary embodiments.

Figure 2:
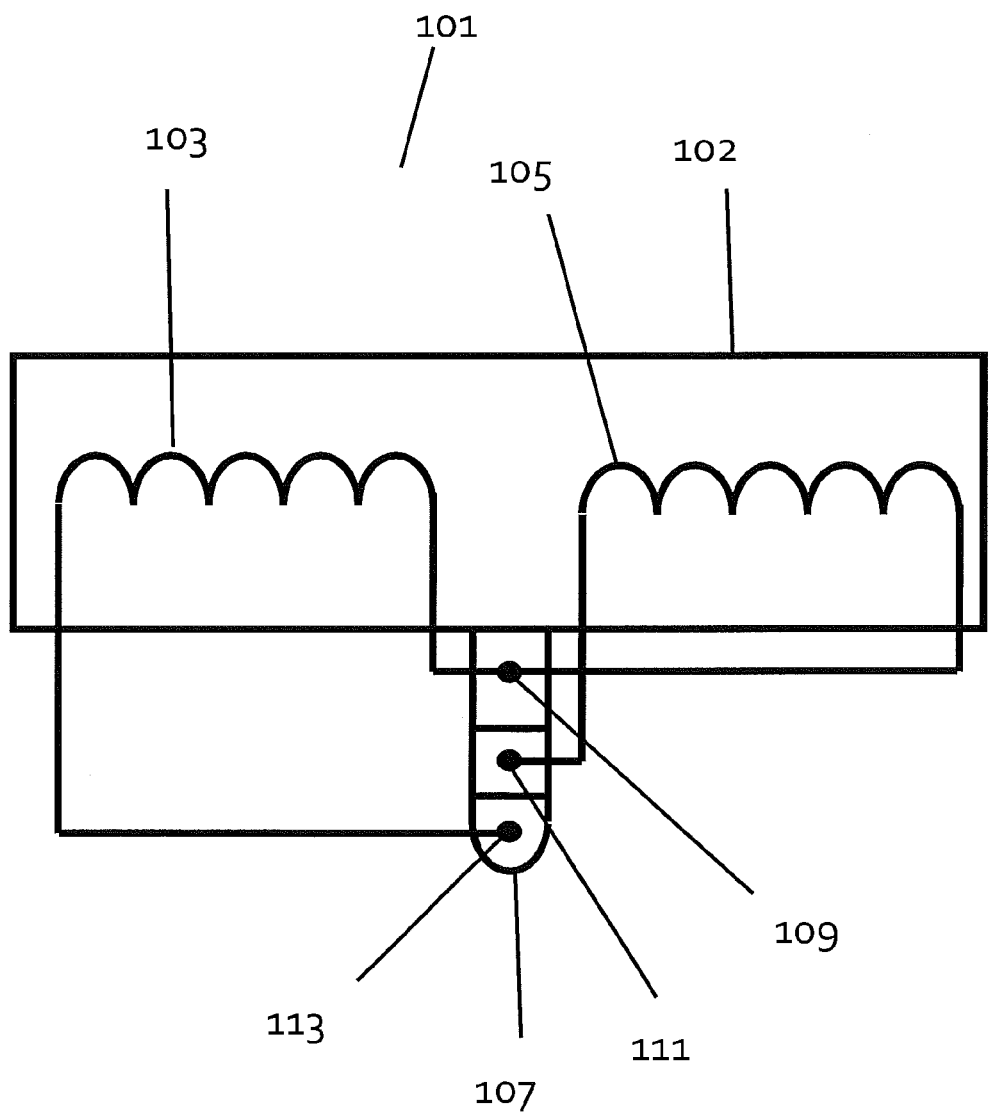
FIG. 2 shows schematically an apparatus suitable for implementing some embodiments of the application and connectable to electronic devices such as shown in FIG. 1.

With respect to FIG. 2, a schematic side view of a further apparatus 101 configured to be connected to the apparatus shown in FIG. 1 via the connection socket is shown. The further apparatus 101 or magnetic induction apparatus in some embodiments comprises a casing 102 for protecting the components of the magnetic induction apparatus from physical or other damage. In some embodiments the casing 102 can be a plastic moulding casing which appears similar in colour and shape design to the apparatus 10 and thus provides a pleasant appearance when the magnetic induction apparatus 101 is in contact with the apparatus 10. The magnetic induction apparatus 101 casing 102 furthermore has a protruding connector plug 107. The connector plug 107 is configured to be suitable for insertion within the connector socket 18 such that at least two electrical connections are made between the apparatus 10 and the magnetic induction apparatus 101 so to provide at least one current loop. Although the following examples show the connector plug 107 as an A/V type plug arrangement with connectors being configured to be A/V type connections it would be appreciated that the connector plug can be any suitable plug with associated connections. For example the plug may be a 2.5 mm audio plug, a universal serial bus type plug or a power connector plug.

In some embodiments the magnetic induction apparatus 101 is configured to have casing 102 which physically assists in connecting the apparatus 10 and magnetic induction apparatus 101. For example the casing 102 of the magnetic induction apparatus 101 may be configured to have a moulded a pair of lips which when placed against the apparatus 10 interfere with ridges on the apparatus casing to form a releasable physical connection between the magnetic induction apparatus 101 and apparatus 10. Furthermore the casing 102 may be configured to allow the user to grip the magnetic induction apparatus 101 easily to allow simple insertion and removal from the apparatus. It would be appreciated that any suitable physical releasable connection method could be implemented between the apparatus 10 and magnetic induction apparatus 101.

The magnetic induction apparatus 101 comprises at least one signal loop or coil 103,105. In the example shown in FIG. 2, the magnetic induction apparatus 101 comprises a first signal coil 103 and a second signal coil 105. The signal loop or coil 103, 105 may be manufactured using any suitable process. For example in some embodiments the signal coil is implemented using a conventional inductor or solenoid. In other embodiments the signal coil is implemented within the magnetic induction apparatus 101 as part of a circuit board connector.

In the example shown in FIG. 2, the connection plug 107 comprises three electrically isolated parts, wherein the first signal coil 103 has a first end connected to a common ground or earth part 109 of the connection plug 107 and a second end connected to the left channel connection part 113 of the connection plug 107, and the second signal coil 105 has a first end connected to the common ground part 109 of the connection plug and a second end connected to a right channel connection part 111 of the connection plug 109. In some embodiments the connector plug parts are arranged such that the common ground or earth part 109 is closest to the body or casing of the magnetic induction apparatus 101, the right channel connection part 111 is located adjacent to the common ground part 109 (separated by an insulation or an electrical isolation part), and the left channel part 113 located adjacent to the right channel connection part 111 (once again separated by a second insulation or electrical isolation part) where the left channel connection part 113 is located closest to at the tip of the connection plug 107. It would be appreciated that in other embodiments the physical location of the connection parts may be differently arranged according to the connection plug and socket standards or according to any suitable configuration of the physical location of the electrical connection parts.

Furthermore in such embodiments the connection plug 107 parts may be configured to when inserted in the connection socket 18 of a typical A/V connector socket to connect a left channel signal to the first signal coil 103 and right channel signal to the second signal coil 105, in other words be able to power the magnetic induction apparatus 101 first 103 and second 105 signal coils separately and independently. In some embodiments a differential signal may be used to drive at least one of the signal coils. For example in some embodiments the first signal coil 103 is driven with a first channel signal and the second signal coil 105 is driven with the inverse of the first channel signal to create a greater (2×) differential voltage between the ends of the first and second signal coils. In other embodiments, for example where there is only one signal coil the differential signal may be connected to either end of the signal coil.

It would be appreciated that in some embodiments the magnetic induction apparatus 101 can comprise more than two signal loops or only one signal loop connected. In such embodiments at least one loop is connected across at least two of the connectors such that current may be passed to the signal loop.

For example with respect to FIG. 7 a single signal loop embodiment configuration for a further magnetic induction apparatus 301 is shown. In the example shown in FIG. 7 the single signal loop 605 is implemented mechanically within the connector plug 603. In some embodiments as shown in FIG. 7 the connection plug 603 can be a typical A/V connector plug configured to be suitable for insertion into the connection socket 18 of a typical A/V connector socket. In such embodiments the single signal loop 605 may be connected via a left channel connector 609 at one end (which when the plug is inserted into the connector socket provides a connection for a left channel signal to the single signal loop 605). Furthermore the single signal loop in some embodiments can be connected via the ground connector 607 to the other end of the single signal loop 605 (which when the plug is inserted into the connector socket provides a sink for a left channel signal from the single signal loop 605).

Although the connection is described above as being between the left channel connection and the ground connection paths it would be understood that the signal path may be formed via any two suitable connections.

The example as shown in FIG. 7 has an additional advantage in terms of size. In such embodiments where the signal loop or signal coil is implemented mechanically substantially within the connector plug the integration between the magnetic induction apparatus 301 and the apparatus 10 maintains the form of the apparatus more faithfully and thus does not require the user to repurchase accessories which are form dependent. For example the apparatus in such embodiments would still be likely to fit into a protective case. Similarly the cost of manufacturing the magnetic induction apparatus 301 may be reduced as the casing 601 can be significantly reduced to be only the amount of material suitable for allowing the user to insert and remove the magnetic induction apparatus.

In some embodiments the connector plug may be configured to have at least one of the connector parts found in a conventional plug to be made from a non conductive material in order to increase the induction efficiency. For example in the above example shown in FIG. 7 the area typically provided as the right channel connector between the areas for the left channel connector and ground can be manufactured from plastic.

Although the signal coil significantly mechanically implemented within the connector plug as shown in FIG. 7 is a single signal loop or coil configuration it would be appreciated that in some embodiments more than one signal loop or coil may be implemented. For example in some embodiments a second signal loop can be implemented mechanically significantly within the plug socket and thus improve the induction field strength. In such embodiments and similar to the example shown in FIG. 2 the second signal loop implemented significantly mechanically within the plug may be connected between the right connector and the ground connectors.

In some embodiments the magnetic induction apparatus 101 can comprise an amplifier configured to receive the signals from the apparatus and amplify the current and/or voltage across the signal loop or coil to produce stronger magnetic fields. Furthermore in some embodiments the magnetic induction apparatus 101 may comprise a power source suitable for supplying power to the amplifier.

It would be appreciated at the embodiments of the application shown above describe where the connector plug/socket is arranged in such a way that each coil receives a left or right channel signal which would be passed to a headset when inserted. However it would be appreciated that any other suitable connection may be configured to be provided. For example each coil may be connected to the output of an induction amplifier within apparatus when it is determined that the plug inserted into the socket is a T-coil induction coil rather than audio transducer coil.

Thus in such embodiments the signal loops and/coils are suitable for generating a magnetic field by induction (and similarly for detecting a magnetic field) and by supplying suitable current to the apparatus connector socket, which is transferred to the connectable apparatus connector plug and thus to at least one signal coil a suitable magnetic field may be inducted. This inducted magnetic field in some embodiments furthermore may be generated to be suitable for T-coil hearing aid applications. The magnetic induction apparatus 101 thus provides a simple universal solution to the issue of providing T-coil compatability. Furthermore these embodiments do not require significant hardware design to produce special product programs suitable for T-coil compatability.

Furthermore in such embodiments the inductor size, in other words the signal coils and loops may be scaled to meet requirements such that depending on the application a different coil may be selected.

The embodiments may have further advantages in that by using two channels, such as shown above, for driving an audio signal in the hearing aid it may be possible to boost the coupling effect.

Thus in summary by connecting the magnetic induction apparatus 101 to a mobile phone (apparatus 10) a hard of hearing user may use what would be a normal phone without the need for the mobile phone to be significantly redesigned as it uses a suitable connection such as the provided A/V connector socket.

Furthermore by making the magnetic induction apparatus 101 releasably connectable to the apparatus 10 the user only requires one magnetic induction apparatus 101 which is configured to operate with many different devices and so may transfer it from device to device whenever needed.

In some other embodiments the magnetic induction apparatus 101 and the signal loop and/or coil configuration may be used for other uses.

For example in some embodiments the induction coil may be used as a data exchange transmitter and/or receiver. In such embodiments the apparatus may be configured to operate as an electronic wallet, metro card, or security identifier. In some embodiments the magnetic induction apparatus 101 operates as a dumb transceiver—in other words providing an interface with contactless magnetic induction systems such as magnetic contactless travel cards. In some embodiments the apparatus 10 is configured, for example with respect to the processor and memory of the apparatus, to store, control and process the information and processes required to operate the contactless magnetic induction system.

In some further embodiments the signal coil and/or loop may be used to transfer energy between the apparatus and a further apparatus located nearby by magnetic induction. In such embodiments the connectable apparatus may be connected to each apparatus and thus prevent the need for multiple power cables to be used.

For example in such an embodiment the connection socket may detect an input electrical current from the signal loops and use it to power the battery of the apparatus 10.

In some embodiments the signal coil may be configured to act as a radio frequency (RF) antenna suitable for receiving or transmitting RF signals. For example the signal coil may be suitable for detecting or transmitting frequency modulation (FM) RF signals suitable for example for receiving FM broadcast signals or generating short range RF signals for example for allowing connection to car audio systems via the car audio RF receiver.

Figure 3:
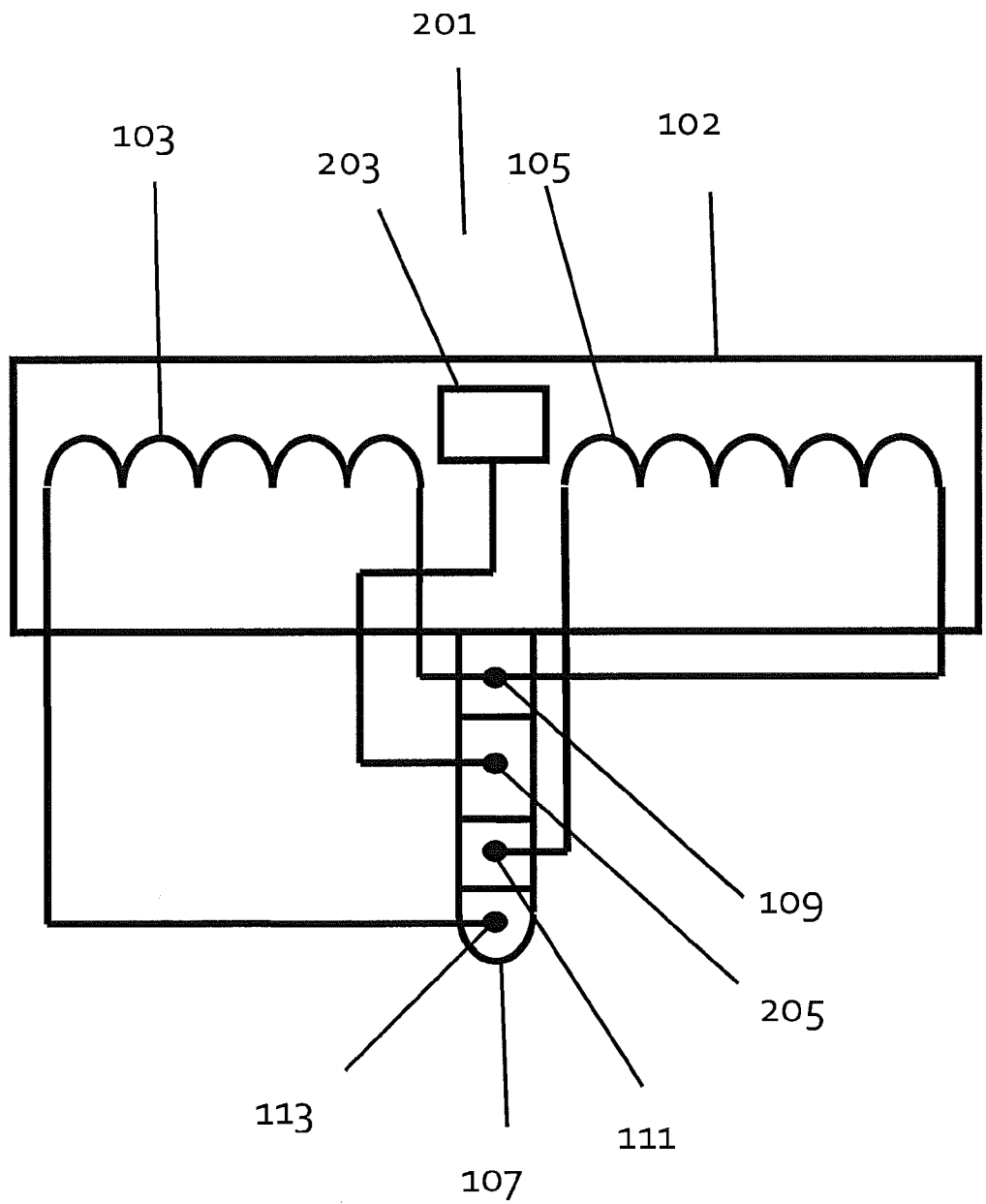
FIG. 3 shows schematically a further apparatus suitable for implementing some further embodiments of the application and also connectable to electronic devices such as shown in FIG. 1.

With respect to FIG. 3 some further embodiments are shown. In some embodiments the connectable apparatus is similar to the apparatus shown in FIG. 2 wherein the connectable apparatus further comprises an identifier unit 203. The identifier unit 203 is further connected to the connector plug 107 and specifically to a further connector part 205 which is electrically isolated from the previously described connector parts. The further connector part 205 is configured so that when the connector plug 107 is inserted into the connector socket 18 there is an associated further connector socket part which forms an electrical connection with the further connector plug part 205 and thus may output a suitable signal to the apparatus 10 for determining the type of the magnetic induction apparatus 101. In some embodiments the connector plug parts are arranged such that the common ground or earth part 109 is closest to the body or casing of the magnetic induction apparatus 101, the further connector part 205 is located adjacent to the common ground part 109 (separated by an insulation or an electrical isolation part), the right channel connection part 111 is located adjacent to the further connector part 205 (separated by a second insulation or an electrical isolation part), and the left channel part 113 located adjacent to the right channel connection part 111 (separated by a third insulation or electrical isolation part) where the left channel connection part 113 is located closest to at the tip of the connection plug 107.

It would be appreciated that in some other embodiments the physical location of the connection parts may be differently arranged according to the connection plug and socket standards or according to any suitable configuration of the physical location of the electrical connection parts.

Figure 5:
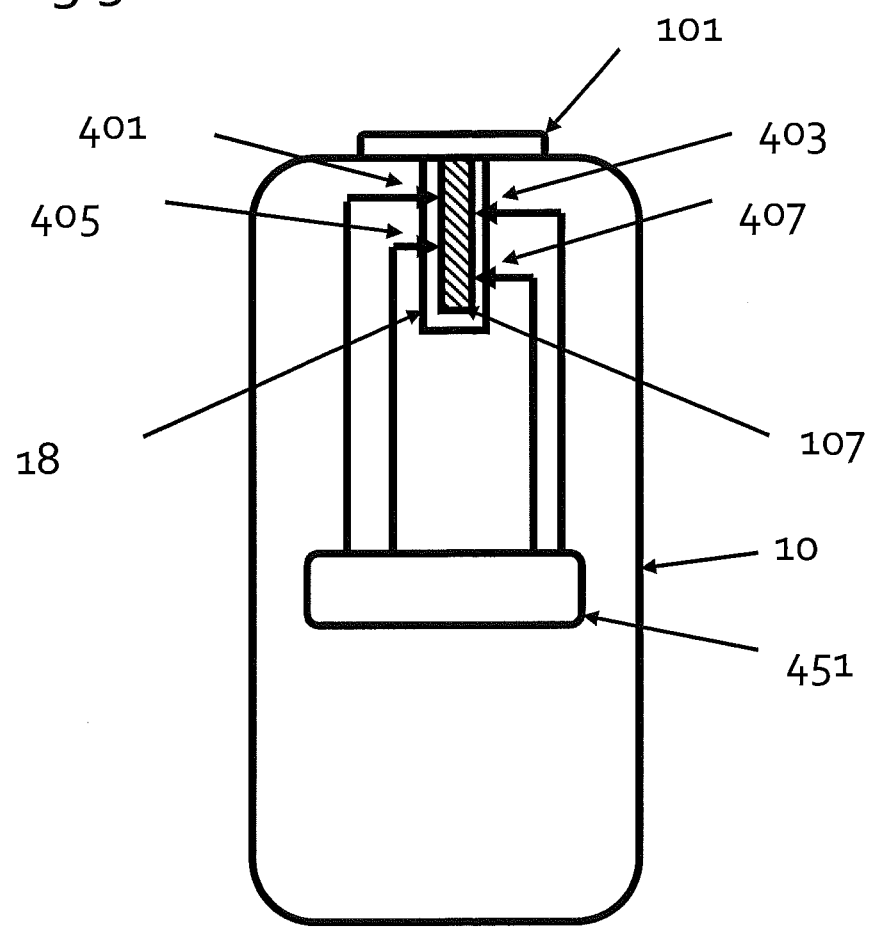
FIG. 5 shows schematically the electronic device and apparatus interfacing according to some embodiments of the application.
Figure 6:
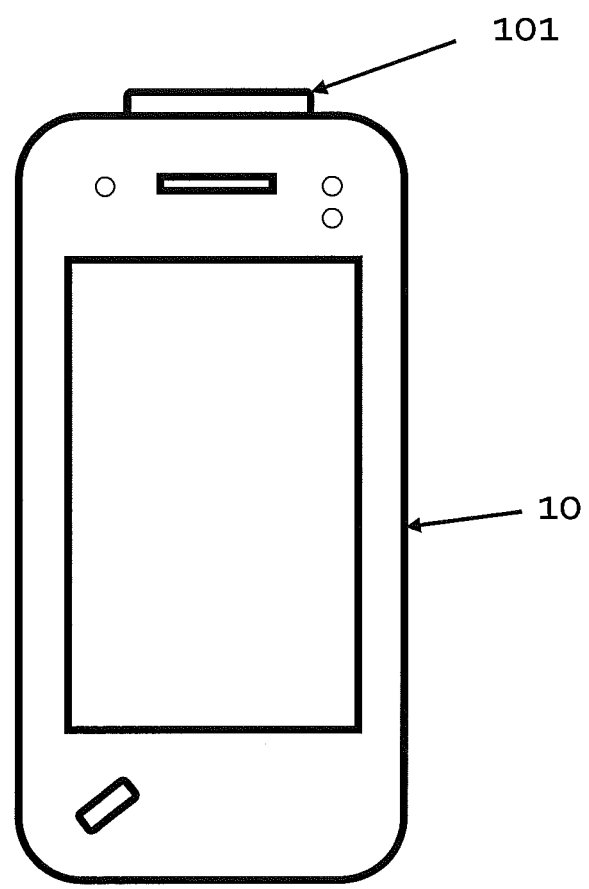
FIG. 6 shows schematically the electronic device and apparatus when interfaced according to some embodiments of the application.

Furthermore with respect to FIGS. 5 and 6 schematic views of the embodiments of the magnetic induction apparatus 101 plug 107 when inserted into the apparatus 10 socket 18 is shown.

With respect to FIG. 5 the connections within the apparatus 10 socket 18 is shown in further detail. In this Figure it is shown the apparatus socket connection ground part 403, suitable for connection to the magnetic induction apparatus 101 plug connection ground part 109, the apparatus socket connection left channel part 407, suitable for connection to the magnetic induction apparatus 101 plug connection left channel part 113, the apparatus socket connection right channel part 405, suitable for connection to the magnetic induction apparatus 101 plug connection right channel part 111, and the apparatus socket connection further (or identification signal) part 401, suitable for connection to the magnetic induction apparatus 101 plug connection further (or identification signal) part 205. The above connection configuration is for example only and it would be appreciated that any suitable design for connection arrangement may be used.

Furthermore with respect to FIG. 6 a simple view of the magnetic induction apparatus 101 when connected to the apparatus 10 as a mobile phone is shown. In such an example it can be shown that by placing the magnetic induction apparatus 101 and thus the coil near to the conventional acoustic transducer arrangement according to some embodiment enables the apparatus to be places near to the hearing aid while allowing the microphones to pick up the voice of the user normally.

Figure 4:
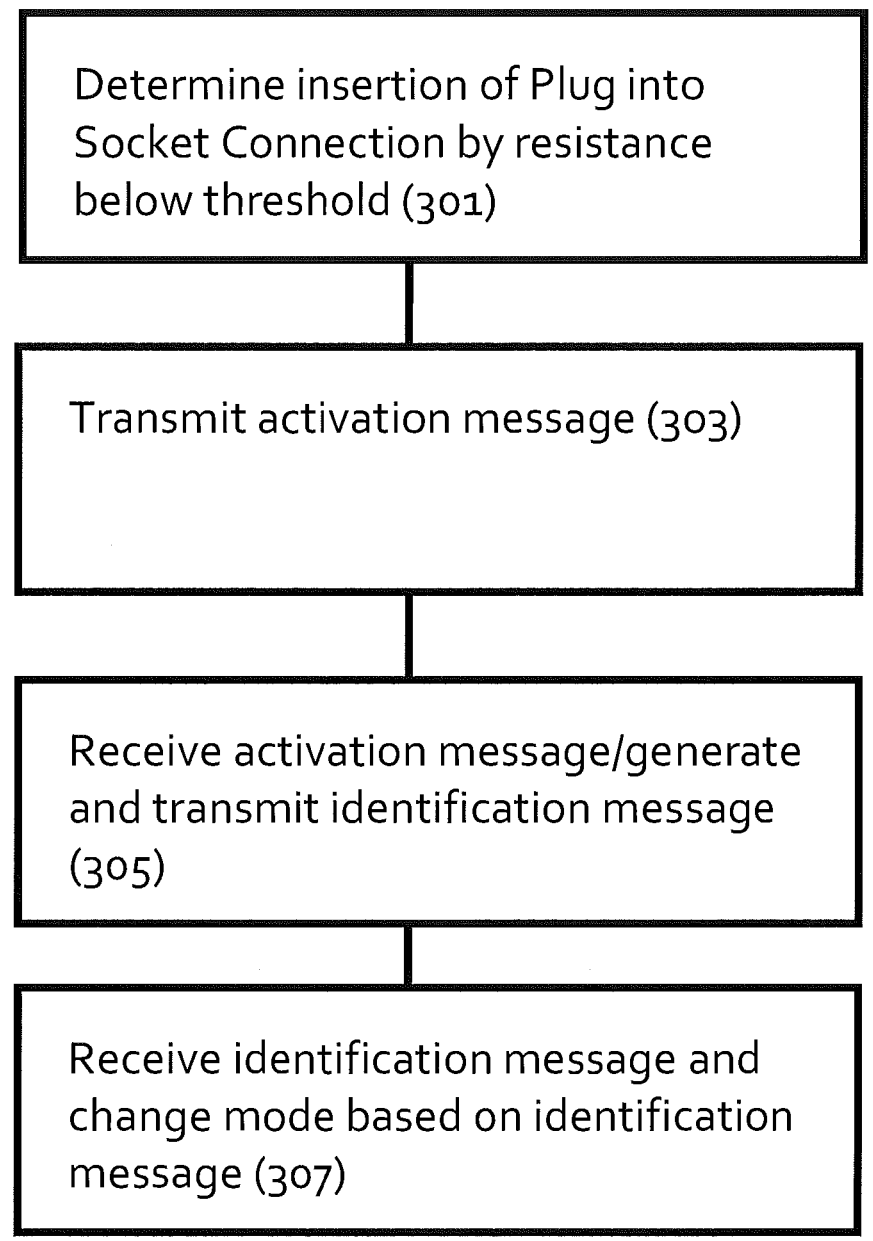
FIG. 4 shows schematically methods for implementing some embodiments of the application as shown in FIGS. 2 and 3.

In order to further explain the operation of the connectable apparatus shown in FIG. 3, FIG. 4 shows the operation of the apparatus 10 detecting the connection of plug within the socket.

In the first step the apparatus 10 determines that there has been inserted a connection plug, such as the connection plug protruding from the casing of the magnetic induction apparatus 101 into the apparatus socket 18. In some embodiments this may be determined by the apparatus wherein if a resistance across the left connector, right connector and a common ground drops below a predefined value then the apparatus determines that a connector has been inserted. In other embodiments the determination of a physical connection may be performed using any suitable operation including mechanical detection or optical detection methods.

The operation of determination of a plug into the socket is shown in FIG. 4 by step 301.

When a connector has been detected then the apparatus attempts to determine what apparatus the plug which has been inserted into the apparatus connection socket is connected to.

In some embodiments the apparatus 10 may be configured to determine the type of connector by measuring the resistance or inductance of the connector plug.

However in the example shown in FIG. 4 the apparatus is configured to generate and pass an activation or identification request message to the connection plug and so to the apparatus connected to the plug. For example in some embodiments the activation signal may be a power signal with a defined voltage. However it would be appreciated that any suitable request message type may be implemented according to some embodiments of the application.

The generation and transmission of the activation message may be shown in FIG. 4 by step 303.

The activation message (identification request) is then in some embodiments received by the magnetic induction apparatus 101 and specifically by the identification unit 203 which generates a response message or signal in response to the activation message. Thus in the above example the identification unit may be a resistor with a well defined resistance and such the response message is the current defined by the resistance. In some other embodiments the identification unit 203 may be a processor configured to generate a predefined pulse signal on receiving an activation signal or identification request.

The reception of the activation message and the response generated is shown in FIG. 4 by step 305.

The identification response may then be detected by the apparatus which in response to the identification determination may be configured to operate in such a way to optimise the use of the magnetic induction apparatus 101. For example on determining a specific resistance via the further connection part connection socket the processor may be configured to operate the mobile phone in a T-coil compatible mode. In other words the processor may switch the audio transducer off and power a driver for providing current to the signal coil or signal coils of the magnetic induction apparatus 101 in order to provide magnetic induction signals to the T-coil hearing aid. The operation of receiving the identification signal and controlling the mode of operation of the apparatus 10 is shown in FIG. 4 by step 307.

Thus for example as described above the identification unit 203 may allow the apparatus 10 to determine the number and orientation of each of the signal coils and thus select the coil or coils most suitable for the application using the signal coils. In some embodiments by determining the number of signal coils the processor may determine how to implement the driving of current through the signals coils. Thus for example dependent on the identification (which may be positive or negative identification—in other words if a specific magnetic induction apparatus is not identified then a default parameter setting is used) the signal coils or loops may be driven with a positive—ground configuration such that a left channel signal is passed to a first coil, and a right channel signal passed to a second coil. Similarly, for example, dependent on the identification the signal coils may be differentially driven—either across a single coil or across multiple coils. Furthermore where the differential signal is connected across multiple coils there may be a reference potential at the node between the two signal coils.

As described above in some embodiments the identification unit 203 may comprise a processor. In some embodiments the identification unit 203 may thus provide the authentication, authorization and memory elements required to operate as a cashless wallet—with the power being supplied from the apparatus and further the apparatus used as a dumb terminal displaying the wallet contents and options.

In some embodiments the processor of the apparatus can, on detecting the presence of at least one signal loop or signal coil via the socket-plug connection, according to any suitable detection operation or parts, configure the operation of the apparatus furthermore to optimise the parameters for the identified magnetic induction apparatus. For example the amplifier driving the signal to the connector may be configured to drive a first current level when a conventional headset is determined and drive a second current level when a magnetic induction apparatus is identified. In some further embodiments different magnetic induction apparatus configuration when identified can cause the processor to switch to using parameters optimised for the identified magnetic induction apparatus. For example the processor may configure connections with audio sub-systems when an audio induction apparatus is identified and connections with power regulation systems when a power or charging induction apparatus is identified.

In some embodiments when the magnetic induction apparatus is identified on insertion in the apparatus can cause the display to display a message, prompt, or alert to the user to indicate to the user that the magnetic induction apparatus is inserted and connected. In some embodiments the prompt may require a user input which then permits or refuses the processor to operate using the magnetic induction apparatus or permits a manual selection for the operation of the magnetic induction apparatus. For example the display may provide the choice of the apparatus to use the magnetic induction apparatus in hearing aid compatible mode, radio frequency mode, data connection mode, power charging mode and a selection of at least one of these then causes the processor to configure the parameters operating the magnetic induction apparatus in such a mode.

In some embodiments the insertion of the magnetic induction apparatus does not exclude the operation of the earpiece or acoustic transducer at the earpiece of the apparatus. For example in some embodiments the prompt display may permit the user of the apparatus the option of activating or deactivating the acoustic transducer of the apparatus when the magnetic induction apparatus is inserted.

Although in the above examples the coils or loops are fixed in position relative to the magnetic induction apparatus it would be appreciated that the coils or loops may be adjustable. In some embodiments this may be provided by having a flexible connection between the connector plug and the casing housing the signal loops or coils. For example the connection may be a rotational cuff or joint permitting the flexibility of rotational adjustment in at least one direction. In other embodiments the connection can be translationally adjusted, for example by having a telescopic connection. In some embodiments these adjustments may be controlled and/or implemented by motors controlled by the processor.

In some further embodiments the magnetic induction apparatus comprises at least two coils with different positions and/or orientations. In such embodiments the adjustment can be implemented by selecting at least one of the coils or loops. In such embodiments a selection of a coil or loop with the best coupling efficiency can be made by the processor. In such embodiments the relative direction/orientation to a further apparatus which is being induced or inducting can be monitored and allowed for.

Hence in at least one embodiment there may be a method comprising: receiving at an apparatus connection socket a further apparatus connection plug with a current loop connection to at least one signal coil; identifying the at least one signal coil; and selecting an operational parameter for the apparatus dependent on the identity of the at least one signal coil.

Furthermore in at least one embodiment identifying the at least one signal coil may comprise: receiving a first signal via the connection socket from the further apparatus; and determining an identity of the at least one signal coil dependent on the first signal.

In at least one of the embodiments the method may further comprise: transmitting an inquiry signal via the connection socket to the further apparatus wherein the further apparatus is configured to generate the first signal dependent on the inquiry signal.

It shall be appreciated that the term electronic device and user equipment is intended to cover any suitable type of wireless user equipment, such as mobile telephones, portable data processing devices or portable web browsers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus in at least one of the embodiments there is an apparatus comprising at least one signal coil; and a connection plug, comprising a first electrical connector connected to one end of at least one signal coil and a second electrical connector connected to a second end of at least one signal coil.

In some embodiments as shown above the at least one signal coil may be physically located substantially within the connection plug.

Furthermore the apparatus may further comprise a housing part, wherein the housing part may be physically connected to the connection plug, and wherein the at least one signal coil may be physically located substantially within the housing part.

Also the apparatus may further comprise an adjustable connection part configured to provide the physical and electrical connection between the housing part and the connection plug.

In some apparatus there may further comprise a switch wherein the at least one signal coil may be at least two signal coils, wherein each signal coil may be configured to be orientated relative to another signal coil, and wherein at least one of the signal coils from the at least two signal coils is selected by the switch.

Furthermore the apparatus may further comprise at least one further signal coil, and the connection plug may comprise a third electrical connector connected to one end of the further signal coil, wherein at least one of the first or second electrical connector may be configured to be connected to the other end of the further signal coil.

The apparatus may further comprise an identification unit configured to be connected to the connection plug and provide a signal to a further apparatus for identifying the apparatus when the apparatus connection plug is inserted into an associated further apparatus socket.

The connection plug may as described above be at least one of a 3.5 mm jack plug; a 2.5 mm jack plug; an universal serial bus plug; and a power connector plug.

Also as described above in some embodiments the signal coil may be configured to generate a magnetic field suitable for reception by a hearing aid.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

Hence in at least one embodiment there is provided a computer-readable medium encoded with instructions that, when executed by a computer perform: receive at a connection socket a further apparatus connection plug with a current loop connection to at least one signal coil; identify the at least one signal coil; and select an operational parameter for the apparatus dependent on the identity of the at least one signal coil.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits (such as field programmable gate array—FPGA circuits) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
  (a) hardware-only circuit implementations (such as implementations in only analog and/or digital circuitry) and
  (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
  (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
  a housing part which is in direct contact and connected to a connection plug; at least one signal coil which is physically located substantially within the housing part, wherein the connection plug comprises a first electrical connection part connected to one end of the at least one signal coil and a second electrical connection part connected to a second end of the at least one signal coil;
  and the apparatus is configured to be connected to a further apparatus comprising a mobile phone handset.

2. The apparatus as claimed in claim 1, further comprising an adjustable connection part configured to provide the physical and electrical connection between the housing part and the connection plug.

3. The apparatus as claimed in claim 1, further comprising a switch wherein the at least one signal coil is at least two signal coils, wherein each signal coil is configured to be orientated relative to another signal coil, and wherein at least one of the signal coils from the at least two signal coils is selected by the switch.

4. The apparatus as claimed in claim 1, further comprising at least one further signal coil, and the connection plug comprising a third electrical connector connected to one end of the further signal coil, wherein at least one of the first or second electrical connector is configured to be connected to the other end of the further signal coil.

5. The apparatus as claimed in claim 1, further comprising an identification unit configured to be connected to the connection plug and provide a signal to a further apparatus for identifying the apparatus when the apparatus connection plug is inserted into an associated further apparatus socket.

6. The apparatus as claimed in claim 1, wherein the connection plug is at least one of:
  a 3.5 mm jack plug;
  a 2.5 mm jack plug;
  an universal serial bus plug; and
  a power connector plug.

7. The apparatus as claimed in claim 1, wherein the signal coil is configured to generate a magnetic field suitable for reception by a hearing aid.

8. An apparatus comprising:
  a connection socket comprising at least a first and second connection and configured to receive a further apparatus connection plug, the further apparatus connection plug comprising a first electrical connection part in direct contact and connected to one end of a further apparatus comprising at least one signal coil and a second electrical connection part in direct contact and connected to a second end of the further apparatus comprising at least one signal coil, wherein the connection socket first connection is configured to be in connection with the connection plug first connection and the connection socket second connection is configured to be in connection with the connection plug second socket; wherein the apparatus comprises a mobile phone handset.

9. The apparatus as claimed in claim 8, further comprising an identifier determiner configured to determine the identity of the further apparatus.

10. The apparatus as claimed in claim 9, further comprising a parameter determiner configured to select at least one operational parameter for the apparatus dependent on the identity of the further apparatus.

11. The apparatus as claimed in claim 9, further comprising a current driver configured to supply a current via the connection plug and the connection socket to the at least one signal coil suitable for generating a magnetic field.

12. The apparatus as claimed in claim 11, further comprising an audio transducer, wherein the current driver is configured to supply a second current to the transducer, wherein the second current and the current supplied to the at least one signal coil are dependent on an audio signal.

13. The apparatus as claimed in claim 12, wherein the signal coil magnetic field is in phase with a magnetic field generated by the audio transducer.

14. The apparatus as claimed in claim 8, is configured to
receive at the connection socket the further apparatus connection plug with a current loop connection to at least one signal coil;
identify the at least one signal coil; and
select an operational parameter for the apparatus dependent on the identity of the at least one signal coil.

15. The apparatus as claimed in claim 14, wherein causing the apparatus to identify the at least one signal coil causes the apparatus to:
receive a first signal via the connection socket from the further apparatus; and
determine an identity of the at least one signal coil dependent on the first signal.

16. The apparatus as claimed in claim 15, is further configured to:
transmit an inquiry signal via the connection socket to the further apparatus wherein the further apparatus is configured to generate the first signal dependent on the inquiry signal.

17. A method comprising:
receiving, at an apparatus connection socket, a further apparatus connection plug with a current loop connection to at least one signal coil;
identifying the at least one signal coil; and
selecting an operational parameter for the apparatus dependent on the identity of the at least one signal coil;
wherein the apparatus comprises a mobile phone handset further comprising a further apparatus housing part which is in direct contact and connected to the further apparatus connection plug; the at least one signal coil which is physically located substantially within the further apparatus housing part, wherein the further apparatus connection plug comprises a first electrical connection part connected to one end of the at least one signal coil and a second electrical connection part connected to a second end of the at least one signal coil.

18. The method as claimed in claim 17, wherein identifying the at least one signal coil comprises:
receiving a first signal via the connection socket from the further apparatus; and
determining an identity of the at least one signal coil dependent on the first signal.

19. The method as claimed in claim 18, further comprising:
transmitting an inquiry signal via the connection socket to the further apparatus wherein the further apparatus is configured to generate the first signal dependent on the inquiry signal.

* * * * *